United States Patent
Miller et al.

(10) Patent No.: US 8,370,725 B2
(45) Date of Patent: Feb. 5, 2013

(54) COMMUNICATION INTERFACE AND PROTOCOL

(75) Inventors: Michael J. Miller, Saratoga, CA (US); Michael J. Morrison, Sunnyvale, CA (US); Philip A. Ferolito, Sunnyvale, CA (US); Jay B. Patel, Los Gatos, CA (US); Toru M. Kuzuhara, Castro Valley, CA (US)

(73) Assignee: MoSys, Inc., Santa Clara, CA (US)

( * ) Notice: Subject to any disclaimer, the term of this patent is extended or adjusted under 35 U.S.C. 154(b) by 409 days.

(21) Appl. No.: 12/697,763

(22) Filed: Feb. 1, 2010

(65) Prior Publication Data

US 2011/0191647 A1 Aug. 4, 2011

(51) Int. Cl.
*G11C 13/00* (2006.01)
(52) U.S. Cl. .......................... 714/776; 714/748; 714/755
(58) Field of Classification Search .................. 714/776, 714/748, 751, 746, 704, 749, 755, 774, 758
See application file for complete search history.

(56) References Cited

U.S. PATENT DOCUMENTS

| | | | | |
|---|---|---|---|---|
| 4,422,171 | A | * | 12/1983 | Wortley et al. ................ 714/748 |
| 6,088,337 | A | * | 7/2000 | Eastmond et al. ............. 370/280 |
| 6,148,422 | A | * | 11/2000 | Strawczynski et al. ....... 714/704 |
| 7,734,987 | B2 | * | 6/2010 | Kaburaki et al. .............. 714/774 |
| 2008/0242236 | A1 | | 10/2008 | Spencer |

FOREIGN PATENT DOCUMENTS

| | | |
|---|---|---|
| KR | 10-2007-0051632 | 5/2007 |
| KR | 10-2008-0099746 | 11/2008 |

OTHER PUBLICATIONS

International Search Report and Written Opinion in Application No. PCT/US2011/022705 mailed Sep. 28, 2011.
Samsung Electronics, et al., "ARQ feedback IE modification (section 15.2.13 .1.1)", IEEE 802.16 Broadband Wireless Access Working Group, IEEE C802.16m-09/2509r1, Nov. 18, 2009.

* cited by examiner

*Primary Examiner* — Fritz Alphonse
(74) *Attorney, Agent, or Firm* — MHKKG

(57) ABSTRACT

An apparatus includes a receiver, an error detection unit, and an acknowledgement unit. The receiver may receive frames of data from a transmitter unit of a second apparatus via a first communication path. The error detection unit may detect data errors in the frames of data received via the first communication path. The acknowledgment unit may maintain an acknowledgement indicator indicative of whether frames received by the apparatus are error free. In response to the error detection unit detecting an error, the acknowledgement unit may indicate an error condition exists by freezing a value of the acknowledgement indicator, or alternatively the acknowledgement unit may set a current value of the acknowledgement indicator to a predetermined error value. Further, the apparatus may successively convey values of the acknowledgement indicator to the second apparatus via a second communication path while the apparatus is receiving frames.

27 Claims, 5 Drawing Sheets

COMMUNICATION INTERFACE AND PROTOCOL

BACKGROUND

1. Technical Field

This disclosure relates to communication links and error detection and handling.

2. Description of the Related Art

Systems that employ communication links with SerDes-based interconnects typically require circuitry not only to serialize and deserialize the data between serial and parallel data formats, but also to ensure accurate transmission across lossy channels. More particularly, in lossy channels, there is a finite probability of data bit loss due to, for example, inter symbol interference, clock jitter, power supply noise, and the like.

In such systems, it may be the data link layer that is responsible for ensuring reliable transport of frame data. However, in many conventional systems, some of the functionality associated with the reliability can incur a great deal of implementation overhead. In some systems this implementation overhead may be necessary due to addressing of multiple endpoints over multiple switches, dropped packets from over-subscribed switches, common mode noise, etc. Accordingly, although necessary in such systems, the implementation overhead may reduce bandwidth efficiency of the link, particularly when transferring smaller data payloads. Thus, to maintain efficiency in the bandwidth utilization of conventional systems, the implementation overhead may be amortized by sending larger data payloads. However, the loss of efficiency and the additional cost of the implementation overhead may be unacceptable for systems that primarily transfer smaller data payloads.

SUMMARY

Various embodiments of a device including a communication interface are disclosed. In one embodiment, an apparatus includes a receiver unit that may be configured to receive frames of data from a transmitter unit of a second apparatus via a first communication path. The apparatus also includes an error detection unit that may be configured to detect data errors in the frames of data received via the first communication path. The apparatus additionally includes an acknowledgment unit that may be configured to maintain an acknowledgement indicator indicative of whether frames received by the apparatus via the first serial communication path are error free. In response to the error detection unit detecting a data error in a received frame, the acknowledgement unit is configured to indicate an error condition exists on the first communication path by freezing a value of the acknowledgement indicator. Further, the apparatus may be configured to successively convey values of the acknowledgement indicator to the second apparatus via a second communication path while the apparatus is receiving frames via the first communication path, including at least one value that indicates that at least one error-free frame has been received from the apparatus.

In one specific implementation, the acknowledgement indicator may include a count value that is indicative of the number of error-free frames received by the apparatus since an initialization event. In addition, freezing the value of the acknowledgement indicator may cause at least two successive identical count values to be conveyed.

In another specific implementation, the acknowledgement indicator may include a single bit. In such an implementation the acknowledgement unit may be configured to toggle a state of the acknowledgement indicator for each received frame for which no data errors are detected by the error detection unit. Further, freezing the value of the acknowledgement indicator may cause at least two successive identical values of the acknowledgement indicator to be conveyed to the second apparatus.

In another embodiment, an apparatus may include a transmitter unit configured to transmit frames of data to a receiver unit of a second apparatus via a first communication path. The apparatus may also include a receiver unit that may be configured to successively receive values of an acknowledgement indicator from the second apparatus via a second communication path while the transmitter unit is transmitting frames via the first communication path, including at least one value that indicates that at least one error-free frame has been received by the receiver unit of the second apparatus. The values of the acknowledgement indicator are indicative of whether error-free frames were received by the second apparatus via the first communication path. Further, the apparatus may include an error handling unit that may be configured to determine an error condition exists in response to detecting that the receiver unit of the apparatus has received a frozen value of the acknowledgement indicator from the second apparatus.

In one particular implementation, the error handling unit may be further configured to determine that an error condition exists in response to detecting at least two successive identical values of the acknowledgement indicator

Figure 1:
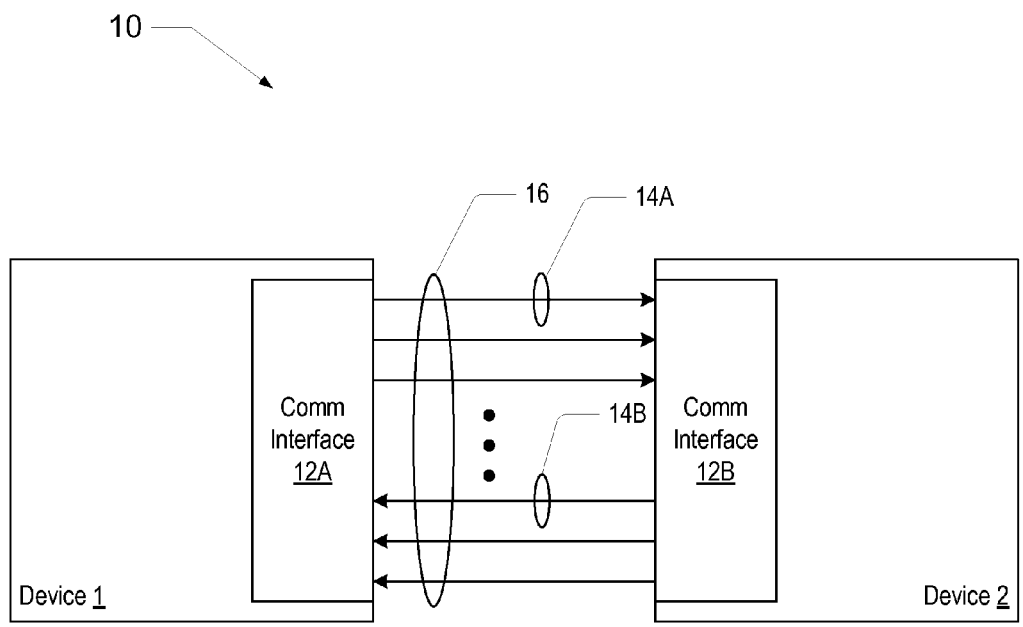
FIG. 1 is a block diagram of one embodiment of a system including a communication link between two devices.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must).

Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Many conventional communication links use precise positive acknowledgement schemes. In these conventional systems, it is assumed that errors can happen fairly often over long latency channels, therefore the system acknowledges precisely every frame received. Any frame that is not acknowledged in an appropriate amount of time is retransmitted. Link bandwidth efficiency is optimized at cost of complexity in control and higher bandwidth allocated to acknowledgment information flow. These solutions require more complexity, window queuing, and protocol complexity. In many cases these types of systems are implemented in software drivers or microcode within embedded controllers. The window approach not only requires a retransmit queue on the transmit side, but can also add to latency and complexity at the receiver side by requiring a queue to hold all frames until missing frames are recovered.

Turning now to FIG. 1, a block diagram of one embodiment of a system including a communication link between two devices is shown. The system 10 includes a device (e.g., device 1) coupled to another device (e.g., device 2) via a serial communication link 16. Device 1 includes a communication interface 12A, and device 2 includes a communication interface 12B. Generally speaking, each of the devices 1 and 2 may embody any type of apparatus and implement any particular functionality, as desired. As such, circuitry implementing each of devices 1 and 2 or aspects thereof may be incorporated on a single integrated circuit (IC) or on different ICs. In one exemplary embodiment, one device (e.g., device 1) may be representative of a memory controller, and the other device (e.g., device 2) may be representative of a memory device.

It is noted that a communication link such as communication link 16 refers to the physical interconnect, whether wired or wireless, between two devices for conveying information. For example, in one embodiment in which two integrated circuit (IC) chips mounted on a circuit board are interconnected via a wired communication link, the communication link may include any number of wire traces on the circuit board. Accordingly, in the embodiment shown in FIG. 1, the communication link 16 includes unidirectional communication paths (e.g. 14A) that convey information serially from device 1 to device 2, and unidirectional communication paths (e.g. 14B) that convey information serially from device 2 to device 1. It is noted that in various embodiments, there may be any number of unidirectional communication paths 14A and 14B within the serial communication link 16. However, it is also noted that in other embodiments the communication link 16 may instead include any number of bidirectional serial communication paths. Alternatively, communication link 16 may include both unidirectional and bidirectional serial communication paths.

As described in greater detail below in conjunction with the description of FIG. 3, in one embodiment, each communication interface 12 may include logic for receiving transactions from other circuits within the respective device, formatting the transactions using a particular data frame format (shown in FIG. 2), and transmitting and receiving formatted frames of data on the communication link 16. In addition, each communication interface 12 may be configured to check the received frames for errors and to freeze acknowledgments upon finding an error.

Figure 2:
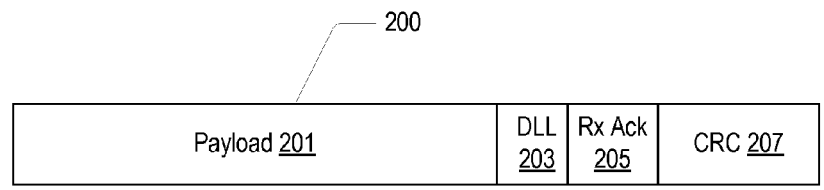
FIG. 2 is a diagram depicting one embodiment of a data link layer frame protocol used in the communication link of the system shown in FIG. 1.

Referring to FIG. 2, a diagram depicting one embodiment of a data link layer (DLL) frame that may be conveyed on the communication link 16 of FIG. 1 is shown. The frame 200 includes a payload field 201, a DLL field 203, a receive acknowledgment (Rx Ack) field 205, and a cyclic redundancy code (CRC) field 207.

In one embodiment, the payload field 201 includes a number of data bits when the frame is transporting data such as, for example, read and write memory data (i.e., for a load or store, respectively). However, when the frame is a control frame the payload field 201 may include control information such as one or more control or command words. In one specific implementation the payload field 201 may be 72 bits in length. However in other embodiments, other number of bits may be used.

The DLL field 203 is used to indicate to a receiver whether the frame is conveying data (e.g., transaction layer information) or whether the frame is conveying control information (e.g., data link information). In one embodiment, the DLL field 203 may be a single bit, while in other embodiments, the DLL field 203 may be a multi-bit encoding used to indicate various types of data or various types of control frames. The Rx Ack field 205 is used to convey a positive acknowledgement indicator back to the transmitter of the device that sent the frames that no errors were found in previously transmitted frames. In one embodiment, the Rx Ack field 205 may be a single bit Ack indication, while in other embodiments the Rx Ack field 205 may be a multi-bit encoding that provides a count value. The CRC field 207 is used to convey CRC bits from a transmitter of one device to the receiver of another device for error checking. In one specific implementation, the CRC field 207 may include any number of bits sufficient to protect the number of bits in the remainder of the frame 200, or in one or more previous frames as desired.

Figure 3:
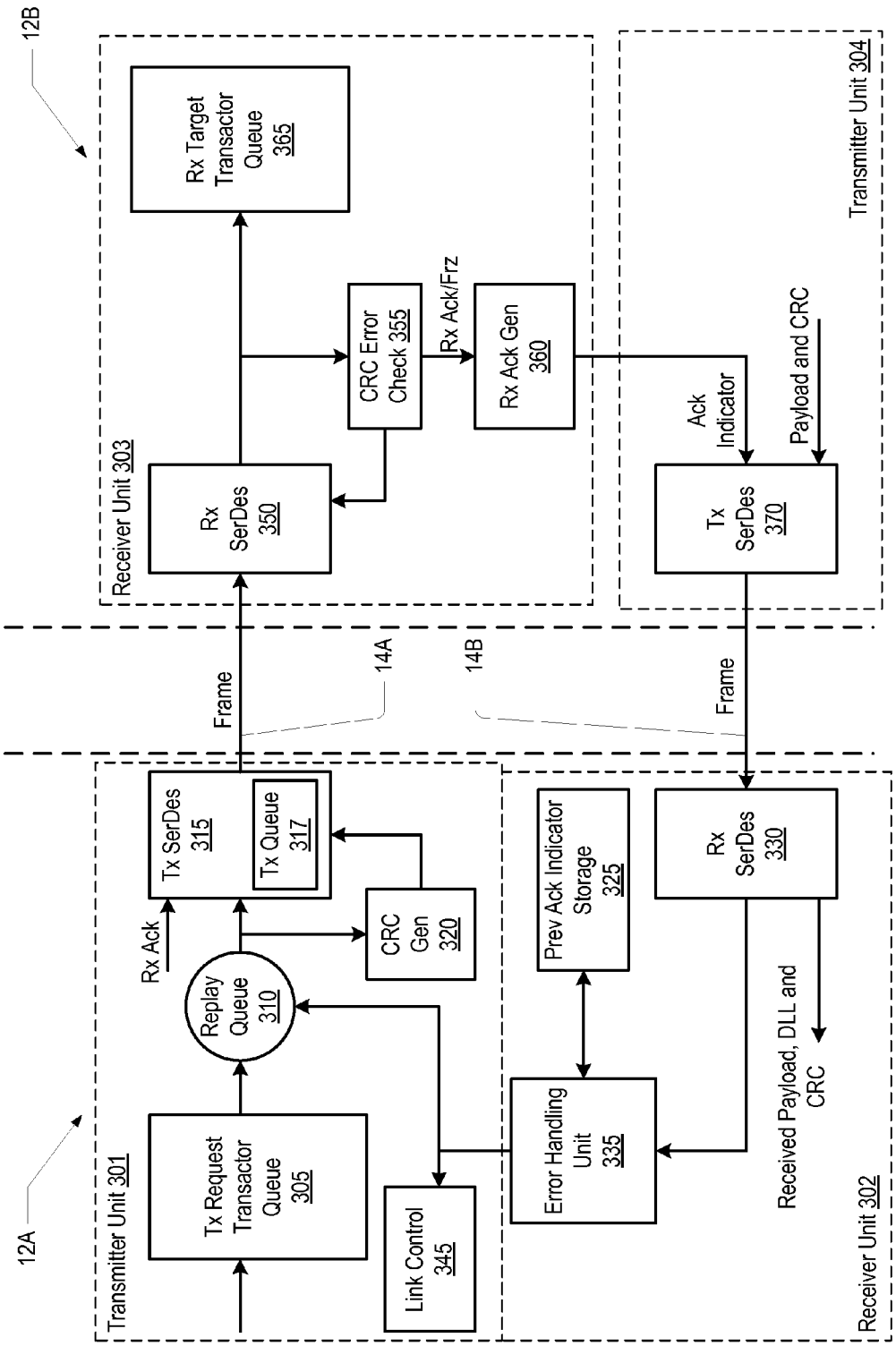
FIG. 3 is a block diagram of one embodiment of a communication interface shown in FIG. 1.

Turning to FIG. 3, a diagram illustrating more detailed aspects of one embodiment of the communication interfaces 12A and 12B of FIG. 1 is shown. The communication interface 12A includes a transmitter unit 301 that includes a transmit (Tx) request transactor queue 305 coupled to a replay queue 310. The replay queue 310 is coupled to the Tx SerDes 315, a link control unit 345, and to a CRC generator 320, which is also coupled to the Tx SerDes 315. The Tx SerDes 315 is coupled to the Rx SerDes 350 of the communication interface 12B via a communication lane 14A of the communication link 16. It is noted that in some embodiments the transmitter unit 301 may be operated without the replay queue 310.

The communication interface 12A also includes a receiver unit 302 including a Rx SerDes 330 that is coupled to an error handling unit 335, which is in turn coupled to a link control unit 345 and to the replay queue 310. The error handling unit 335 is also coupled to a previous Ack indicator storage 325.

The receiver unit 303 of device 12B includes the Rx SerDes 350 which is coupled to a RX target transactor queue 365 and to a CRC error check unit 355. The CRC error check unit 355 is coupled to a Rx Ack generator unit 360. The Rx Ack generator unit 360 is coupled to the Tx SerDes 370 of the transmitter unit 304 of device 12B. The Tx SerDes 370 is coupled to the Rx SerDes 330 of device 12A via the communication lane 14B of the communication link 16.

In one embodiment, the Tx request transactor queue 305 may store transactions received from other circuit portions of device 1, for example. Transactions that will be transmitted may be stored in the replay queue 310 in implementations that use the replay queue 310. Each transaction may be formatted into the frame format shown in FIG. 2, for example, and stored within the Tx queue 317 of the Tx SerDes 315. In one embodiment, the CRC generator 320 may generate the CRC based upon the remaining bits in the frame and then append the CRC to the frame. In another embodiment, to provide stronger error detection, the CRC generator 320 may generate a CRC based upon two frames and create a larger CRC than will fit within the CRC field 207 of either frame alone. In such an embodiment, the CRC may be conveyed in two frames. Specifically, the CRC may be generated based on two frames and then conveyed in the following two frames. Accordingly, the complete CRC for the two frames will lag the two frames for which the CRC was generated. In yet another embodiment, the CRC generator 320 may generate the CRC based upon the previous frame. Accordingly, in such an embodiment, the CRC generator 320 may generate the CRC based upon the remaining bits in one frame and then send the CRC in the CRC field 207 of the next frame. Thus, the CRC for a given frame will lag the frame for which it was generated by one frame.

In various embodiments, the CRC may be appended to the frame either before or after storage in the Tx queue 317. Other logic, such as the link control unit 345 may control the DLL indication 203 of the frame depending on whether the frame is a data frame or a control frame. More particularly, in one embodiment if the frame is a data frame the DLL indication may be cleared to a logic value of zero, and if the frame is a control frame such as a resume or replay frame, for example, the DLL indication may be set to a logic value of one. It is noted that in other embodiments, the logic value of the DLL indication may be reversed such that if the frame is a control frame, the DLL indication may be cleared to a logic value of zero and vice versa.

In addition, logic within the communication device 12A (not shown) that is similar to the logic shown in communication interface 12B may generate an appropriate Rx Ack indicator (described further below) for each frame to be transmitted by communication device 12A.

Formatted frames may be transmitted by the Tx SerDes 315 to the Rx SerDes 350 via the communication path 14A. The CRC error check unit 355 may check each frame for errors. In one embodiment, the CRC error check unit 355 may detect errors in received frames by generating a CRC value from the received frame and comparing the newly generated CRC value with the CRC value conveyed in the frame. The payload of each frame may be forwarded to the Rx transactor queue 365 if there are no detected errors. In addition the CRC error check unit 355 may notify the Rx Ack generator unit 360 whether an error is present in the current frame. In one embodiment, if there is an error, the CRC error check unit 355 may provide to the Rx Ack generator unit 360 a freeze signal to indicate there is an error, and an Ack signal if there is no error. However, in other embodiments a single error/no error signal may be used. In response, the Rx Ack generator unit 360 may generate and send to the Tx SerDes 370 the appropriate value of the Rx Ack indicator. The Tx SerDes 370 may send that Rx Ack indicator to the communication interface 12A using one or more frames.

More particularly, the Rx Ack generator unit 360 may maintain an acknowledgement indicator that is indicative of whether frames received by the Rx SerDes 350 were error free. Accordingly, in one embodiment, each time an error-free frame is received and the CRC error check unit 355 sends an Ack signal, the Rx Ack generator unit 360 may update (e.g., increment) a running count value that is indicative of the number of error-free frames received since the last time the communication link 16 was initialized or reinitialized. However, if the CRC error check unit 355 detects an error and sends the freeze signal, Rx Ack gen unit 360 may freeze the count value and provide the frozen count value to the Tx SerDes 370. Thus in such an embodiment, the Rx Ack indicator may correspond to a count value. In one embodiment, the Rx Ack field 205 in each frame may only convey a one-bit value. As such, a multi-bit count value may be sent using a number of frames. For example, if the count value is 1011b, the Rx Ack generator 360 may provide that count value either one bit at a time to the Tx SerDes 370, which sends the count value one bit at a time using four frames. In one embodiment, the Rx Ack generator 360 may successively provide each new count value to the Tx SerDes 370 and the error handling unit 335 may be configured to keep track of which frames include a valid Rx Ack indication count value.

Accordingly, freezing the count value refers to stopping the count value from changing. Thus, as the frozen count value is successively sent to the Tx SerDes 370, the receiver unit 302 may detect an error condition by "seeing" the same count value at least two consecutive times. In one embodiment, during an initialization event of the communication link 16, the count value may be initialized an initialization value such as zero (or some other predetermined initialization value). As error free frames are received the count value may be incremented. If for example eleven frames are received and an error is detected in the twelfth frame, Rx Ack gen unit 360 may freeze the count value at eleven and successively provide that frozen count value (i.e., eleven) to the Tx SerDes 370 until the communication link is initialized again in a resume operation, or frames are replayed.

In another embodiment, the Rx Ack indicator sent in each frame may be a single bit that toggles each time an error-free frame is received. As such, the Rx Ack generator unit 360 may simply toggle the Ack indicator each time, and in the event of an error, the Rx Ack generator 360 may freeze the Ack indicator value to the last toggled value.

In the above embodiment freezing the count value refers to stopping the count value from toggling. In one embodiment, during an initialization event of the communication link 16, the Rx Ack indicator value may be initialized to an initialization value such as zero (or some other predetermined initialization value). As each error free frame is received the Rx Ack indicator value may be toggled. If an error is detected, Rx Ack gen unit 360 may freeze the Rx Ack indicator value to the last Rx Ack indicator value and successively provide that frozen Rx Ack indicator value to the Tx SerDes 370 until the communication link is initialized again in a resume operation, or frames are replayed.

In yet another embodiment, the Rx Ack indicator may be a single bit that stays the same as long as frames are found to be error free. When an error is detected, the Rx Ack generator 360 may toggle the last Rx Ack value. Alternatively, the Rx Ack generator 360 may cause the Rx Ack indicator value to be set to a different value such as a predetermined error value.

The Rx SerDes 330 may pass the indicator in the Rx Ack field 205 from the received frame(s) to the error handling unit 335. The error handling unit 335 may be configured to create the new Rx Ack indicator (e.g., multi-bit count value) from the successive Rx Ack indicators received, and compare the new Rx Ack indicator (when it is valid) with the previous Rx Ack indicator stored in the previous Ack indicator storage 325. When a comparison is completed, the new Rx Ack indicator may be stored in the previous Ack indicator storage 325 for the next comparison.

In embodiments in which the Rx Ack indicator is a multi-bit count value, the error handling unit 335 may determine that an error has occurred if two successive Rx Ack indicator count values are the same (i.e., frozen Rx Ack indicator). In embodiments, in which the Rx Ack indicator is a toggled bit, the error handling unit 335 may determine that an error has occurred if the Rx Ack indicator has the same value for two successive frames (i.e., frozen Rx Ack indicator). In embodiments in which the Rx Ack indicator value is a value that stays the same until an error has occurred, the error handling unit 335 may determine that an error has occurred if the Rx Ack indicator value is different on any two successive frames or if the Rx Ack indicator value is set to a predetermined error value.

As described above, depending on the implementation the error handling unit 335 may detect that an error has occurred due to: a frozen Rx Ack indicator, if the Rx Ack indicator value is different on any two successive frames, or if the Rx Ack indicator value is set to a predetermined error value. However, it may not be necessary for a receiver to positively acknowledge all frames. More particularly, in one embodiment, control frames (i.e., frames having a DLL bit that indicates the frame is a control frame) may not be positively acknowledged by a receiver. In such an embodiment, the Rx SerDes 303 may detect control frames and notify the Rx Ack generator 360 in the receiver unit 303 not to increment or change (or not stay the same in one embodiment) when an error-free control frame is received. If an error is detected in the control frames, they may simply be discarded. Thus, it would appear to the device 12A that the Rx Ack indicator is frozen, even though it is not.

Accordingly, so that the device 12A does not falsely detect an error condition in such an embodiment, the link control unit 345 may keep track of the number of control frames and the number of data frames sent, while also accounting for the round trip delay. In one embodiment, to generate a corrected Ack value the link control unit 345 may implement a simple fixed length delay FIFO (not shown) that matches the round trip delay (at link initialization) between a transaction transmit counter and the received Rx Ack indicator. In another embodiment, the link control unit 345 may implement counters and logic to track how many frames are in flight between device 12A and 12B to create the corrected Ack value.

In one embodiment, the link control unit 345 may provide the corrected Ack value to the error handling unit 335 for storage in the Previous Ack indicator storage 325. In one embodiment, the error handling unit 335 may use the value to modify the value stored in the previous Ack indicator storage 325, or to alternatively use the corrected Ack value instead of the value in the storage 325.

If an error is detected, the error handling unit 335 notifies the link control unit 345. In one embodiment, the link control unit 345 may initiate replay operations by, for example, sending one or more control frames to indicate to the receiver section of the communication interface 12B that replay frames will be sent and to unfreeze receiver operations. In one embodiment, the link control unit 345 may cause the DLL indication 203 to indicate that the frame is a control frame (e.g., DLL bit to be set) and to provide predetermined control information for transmission in the payload field 201 of the frame. The predetermined information may be a control word, for example, that indicates the next frames are replay data frames. The transactions in the replay queue 310 may be reformatted into the frame format of FIG. 2, the CRC appended to the formatted frame and the frame transmitted. In response, the receiver unit may reset or reinitialize the Rx Ack indicator value to the initialization value.

The link control unit 345 may then cause the corresponding transactions in the replay queue 310 to be retransmitted. In one embodiment, the replay queue 310 may employ a transmit pointer that points to the next transaction to be retransmitted during a replay and a write pointer that points to the next location to be written with a new transaction. The replay queue may be large enough to accommodate round trip delay between devices via the Rx Ack loop time. As new transactions arrive and are transmitted, items in the replay queue may be overwritten, since by definition they have been assumed to have been transmitted successfully. When an error is detected, the frozen Rx Ack count value may be used to reset the Tx pointer to the Rx count value plus one and replay may start from that location.

In embodiments that do not use a replay queue, the link control unit 345 may cause the DLL indication 203 to indicate the frame is a control frame (e.g., DLL indication to be set) and to provide predetermined control information for transmission in the payload field 201 of the frame. The predetermined information may be a "resume" control word, for example, that unfreezes and/or reinitializes the receiver unit of the communication interface 12B. In addition, the control information may also be a data link message such as a device status inquiry, idle, or pause message, for example.

Figure 4A:
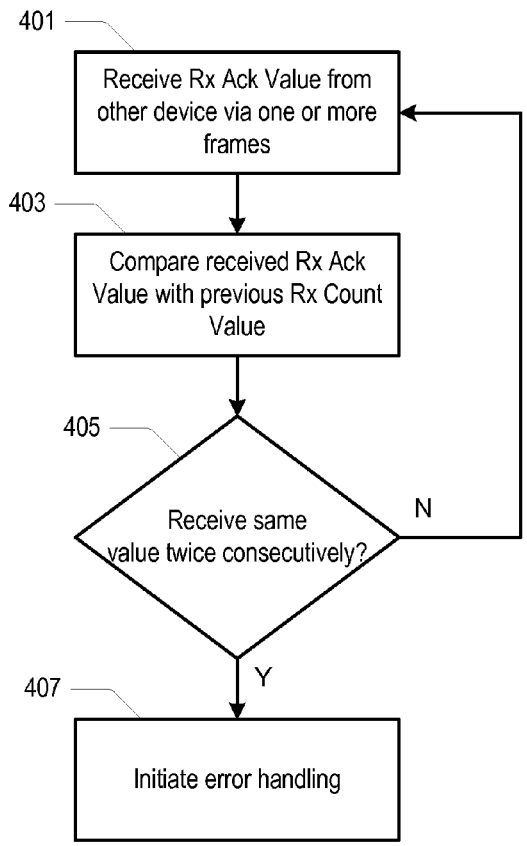
FIG. 4A is flow diagram depicting the operation of one embodiment of a receiver unit of a communication interface shown in FIG. 1 and FIG. 3.

In FIG. 4A, a flow diagram that describes the operation of one embodiment of a receiver unit 302 of a communication interface shown in FIG. 1 and FIG. 3 is shown. Referring collectively to FIG. 1 through FIG. 4 and beginning in block 401 of FIG. 4 in one embodiment, as the Rx SerDes 330 receives each frame, the Rx Ack indicator value is forwarded to the error handling unit 335. In embodiments in which the Rx Ack is a multi-bit count value, the error handling unit 335 may save each Rx Ack value to form the multi-bit count value that is the new Rx Ack indicator value, using for example, a shift register. The error handling unit 335 may then compare the new Rx Ack indicator value to the count value stored in the previous Rx Ack indicator storage 325 (block 403). In embodiments in which the Rx Ack indicator is a single bit that is toggled each time, the error handling unit 335 may compare each single bit to the previous Rx Ack indicator. If the value is not the same during the comparison, operation proceeds as described above in conjunction with the description of block 401.

If new Rx Ack indicator value is the same as the previous Rx Ack indictor (block 405), the error handling unit 335 initiates error handling (block 407). For example, as described above, error handling unit 335 may notify the data link control unit 345 that there is an error and to initiate replay operations or issue a resume operation. In one embodiment, the error handling unit 335 may notify upstream device logic of the error so that the device logic may make appropriate decisions about the lost transactions.

Figure 4B:
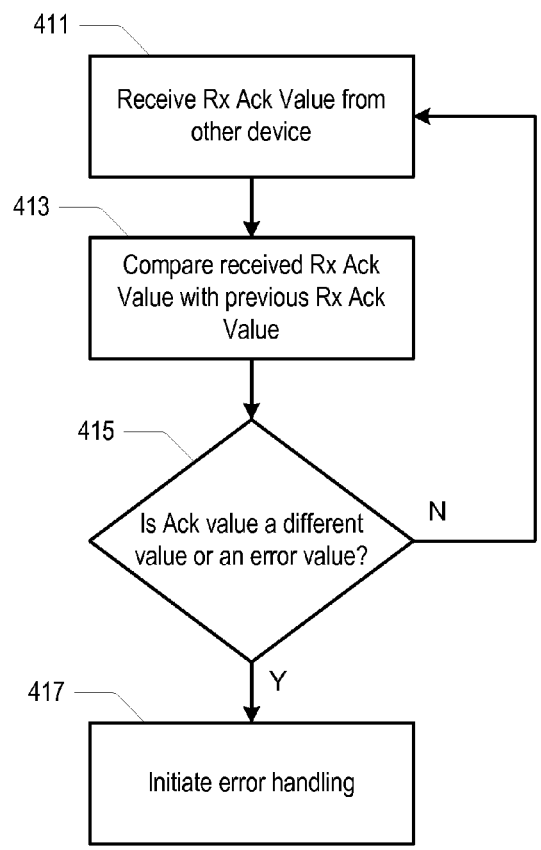
FIG. 4B is flow diagram depicting the operation of another embodiment of a receiver unit of a communication interface shown in FIG. 1 and FIG. 3.

The flow diagram shown in FIG. 4B describes the operation of another embodiment of a receiver unit 302 of the communication interface shown in FIG. 1 and FIG. 3. Referring collectively to FIG. 1 through FIG. 3 and beginning in block 411 of FIG. 4B in one embodiment, as the Rx SerDes 330 receives each frame, the Rx Ack indicator value is forwarded to the error handling unit 335. The error handling unit 335 may then compare the new Rx Ack indicator value to the value stored in the previous Rx Ack indicator storage 325 (block 413). If the value is the same during the comparison, operation proceeds as described above in conjunction with the description of block 411.

If new Rx Ack indicator value is different than the previous Rx Ack indictor value or if the new Rx Ack indicator value is set to a predetermined error value (block 415), the error handling unit 335 initiates error handling (block 417). For example, as described above, error handling unit 335 may notify the data link control unit 345 that there is an error and to initiate replay operations or issue a resume operation. In one embodiment, the error handling unit 335 may notify upstream device logic of the error so that the device logic may make appropriate decisions about the lost transactions.

Figure 5:
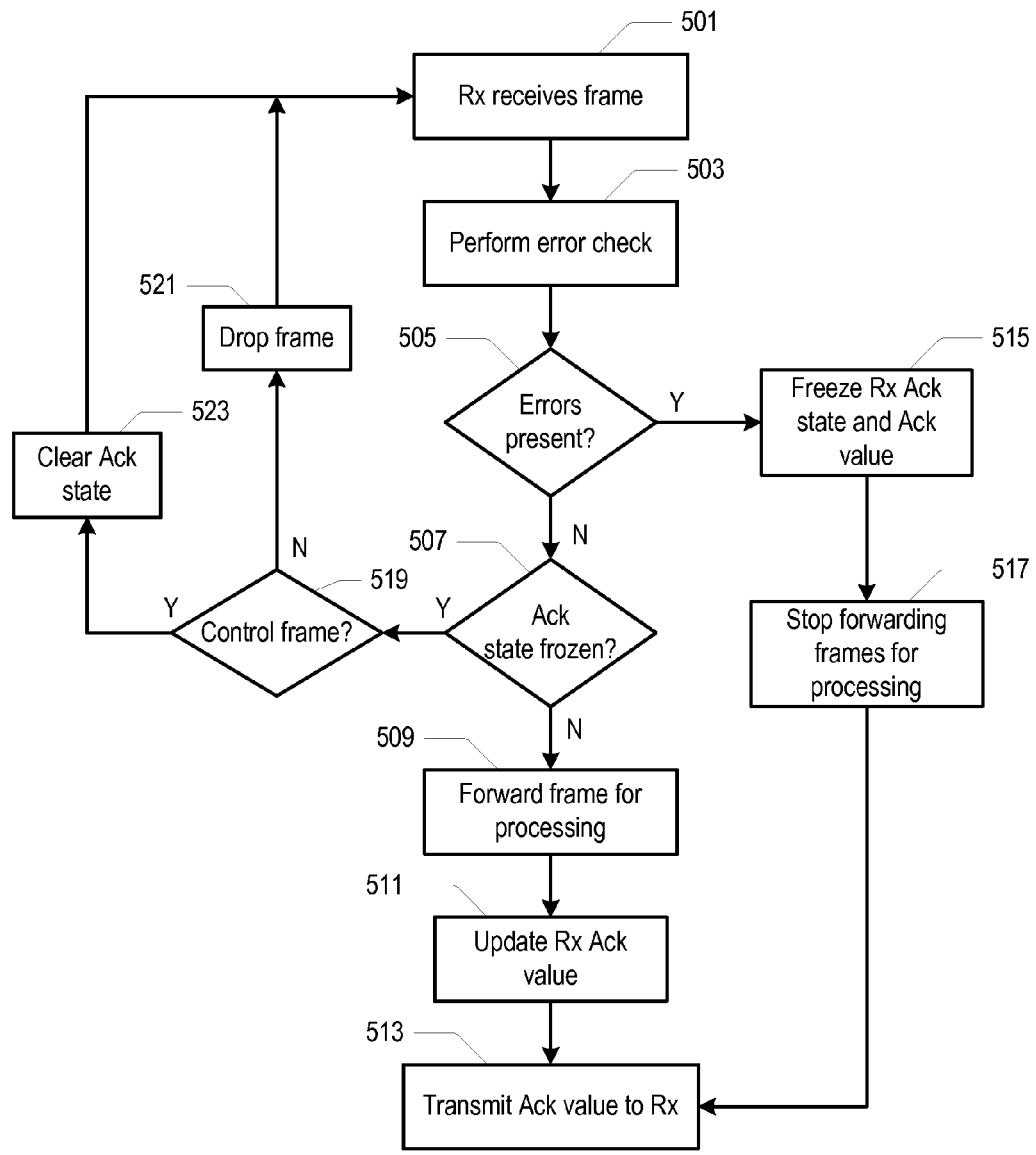
FIG. 5 is flow diagram depicting the operation of one embodiment of a receiver unit of a communication interface shown in FIG. 1 and FIG. 3.

In FIG. 5, a flow diagram that describes the operation of one embodiment of a receiver unit of a communication interface shown in FIG. 1 and FIG. 3 is shown. Referring collectively to FIG. 1 through FIG. 3 and FIG. 5 and beginning in block 501 of FIG. 5 the Rx SerDes 350 receives a frame via the communication path (e.g., 14A). The CRC error check unit 355 may check the frame for errors (block 503). In one embodiment, the CRC error check unit 355 generates a CRC from the received frame and compares the new CRC to the CRC received in the frame. If the frame has no errors (block 505), and the receiver Ack state is not frozen (block 507), the frame is forwarded to the Rx target transactor queue 365 for further processing (block 509).

In addition, the CRC error check unit 355 notifies the Rx Ack generator unit 360 to update or change the Rx Ack indicator (block 511). In one embodiment, the Rx Ack generator unit 360 may maintain and increment a running multi-bit count value (i.e., Rx Ack indicator) representative of the number of error-free frames received since an initialization event (e.g., the last time the communication link 16 was initialized or reinitialized). In another embodiment, the Rx Ack generator unit 360 may simply toggle a one-bit Rx Ack indicator value. The Rx Ack indicator is forwarded to the TX SerDes 370 for transmission on the communication path 14B. In embodiments that use the multi-bit count value as the Rx Ack indicator, the Tx SerDes 370 may transmit each bit in a separate frame as described above (block 513), while in the single-bit embodiments the Tx SerDes 37 may transmit the single Rx Ack value.

Referring back to block 505, if there is an error the CRC error check unit 355 notifies the Rx Ack generator unit 360 and the Rx SerDes 350 of the error. The Rx Ack generator unit 360 may freeze the Ack state and the Rx Ack indicator value (block 515). The frozen Rx Ack indicator may be forwarded to the Tx SerDes 370 for transmission on the communication path 14B. The Rx SerDes 350 may discard the present frame, stop forwarding any subsequent frames to the Rx target transactor queue 365 (block 517), and continue to send the frozen Rx Ack indicator value until the other device either begins replay or reinitializes the communication link 16 as described above.

Accordingly, referring back to block 507, if the receiver receives a frame and the Ack state is frozen, and the Rx SerDes 350 determines the frame is not a control frame (block 519) the Rx SerDes 350 drops the frame (block 521). However, if the frame is a control frame (e.g., a frame that includes appropriate link control information in the payload) (block 519), the Rx SerDes 350 may clear the Ack state and reset the Rx Ack indicator value (block 523). As described above, the control frame may indicate that replay data frames follow or to resume receiving standard data frames. Similarly, in another embodiment, all control frames may be processed if they are error-free, even if the Ack state is frozen.

It is noted that as described above, in an alternative embodiment, the Rx Ack indicator value may be a value (e.g., a single bit value) that remains constant while no errors have been detected in the received frames. This value is repeatedly sent to indicate this error-free state. Upon detecting an error in a received frame, the Rx Ack generator unit 360 changes the value (e.g., to a predetermined error value). In certain of these alternative embodiments, the Ack state may be frozen upon detecting an error in block 625, and, instead of freezing the Ack value, the Rx Ack generator unit 360 may change the Ack value (e.g., to a predetermined error value), which may then be transmitted in block 617. Similarly, instead of updating the Ack value in block 615, the Rx Ack value may stay the same.

Figure 6:
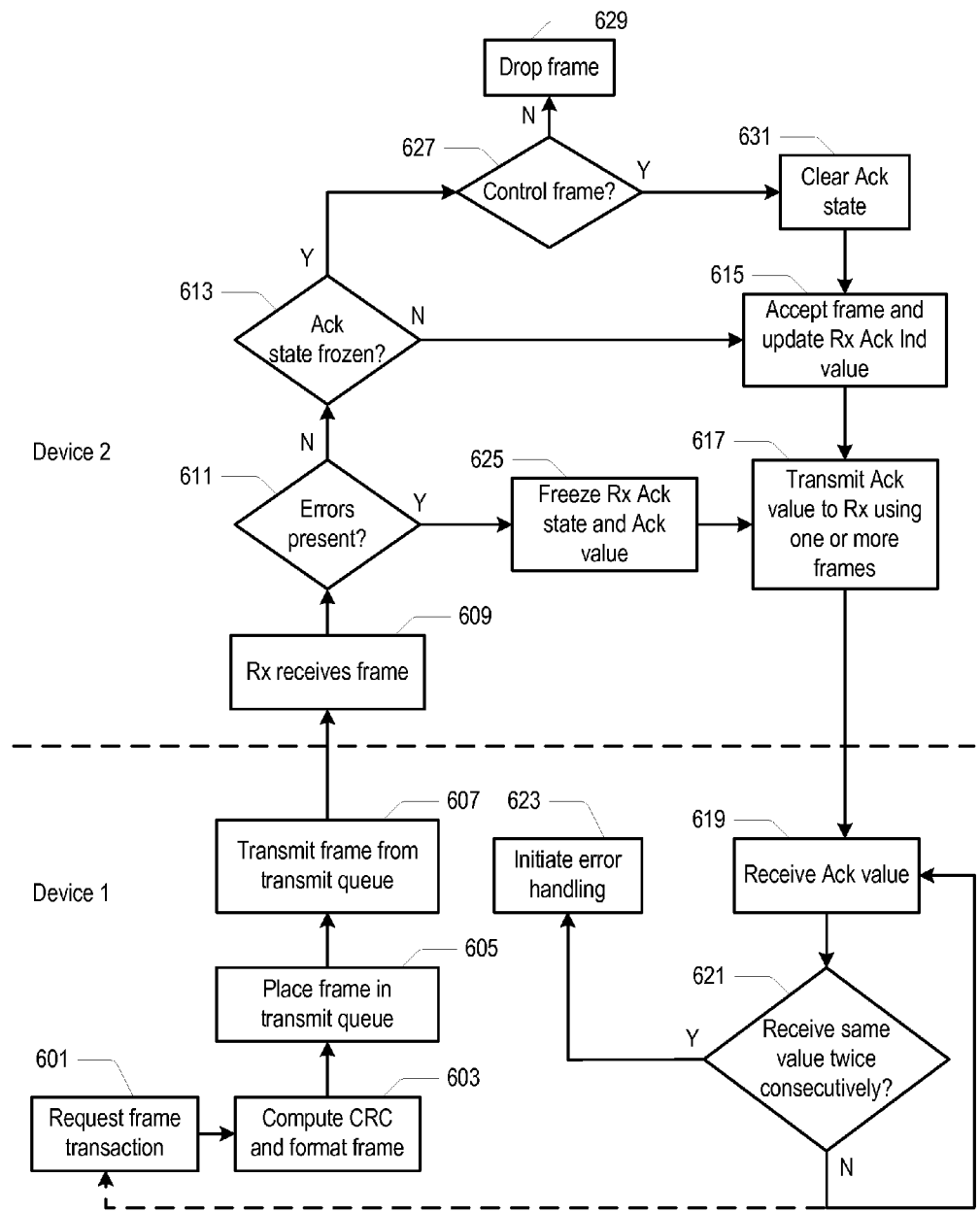
FIG. 6 is flow diagram depicting the operation of an embodiment of a transmit unit of one communication interface and an embodiment of a receiver unit of a second communication interface shown in FIG. 1 and FIG. 3.

In FIG. 6, a flow diagram depicting the operation of an embodiment of a transmit unit of one communication interface and an embodiment of a receiver unit of a second communication interface shown in FIG. 1 and FIG. 3 is shown. Referring collectively to FIG. 1 through FIG. 3, and FIG. 6 and beginning in block 601 of FIG. 6 in one embodiment, the upstream logic in device 1 may store transactions in the Tx request transactor queue 305. As the transmitter of device 1 is ready for a new transaction, a transaction is requested from the Tx request transactor queue 305 (block 601). The CRC is computed by the CRC generator unit 320 and the transaction frame is formatted with the CRC being appended to the frame (block 603). The formatted frame is stored in the Tx queue 317 (block 605). The frame is transmitted from the transmit queue via one or more of the communication paths 14 of the communication link 16 (block 607).

The Rx SerDes 350 receives a frame via the communication path (e.g., 14A) (block 609). The CRC error check unit 355 checks the frame for errors. If the frame has no errors (block 611), and the receiver Ack state is not frozen (block 613), the frame is accepted and the CRC error check unit 355 notifies the Rx Ack generator unit 360 to update the Rx Ack indicator value (block 615) as described above. In one embodiment, the Rx Ack generator unit 360 may maintain and increment a running multi-bit count value (i.e., Rx Ack indicator value) representative of the number of error-free frames received since the last time the communication link 16 was initialized or reinitialized. In another embodiment, the Rx Ack indicator value is a single-bit value that may be toggled each time an error free frame is received. The updated/toggled Rx Ack indicator value is forwarded to the Tx SerDes 370 for transmission on the communication path 14B. The Tx SerDes 370 may transmit the Rx Ack value using one or more frames as described above (block 617).

The Rx SerDes 330 receives the frame including the Rx Ack value (block 619). The Rx Ack value is forwarded to the error handling unit 335. The error handling unit 335 may then compare the new Rx Ack value to the value stored in the previous Rx Ack indicator storage 325. If the Rx Ack value is not the same during the comparison (block 621), operation proceeds as described above in conjunction with the description of blocks 601 and 619.

However, if the new Rx Ack value is the same as the previous Rx Ack value (block 621), the error handling unit 335 initiates error handling (block 623). For example, as described above, error handling unit 335 may notify the data link control unit 345 that there is an error and to initiate replay operations or issue a resume operation.

Referring back to block 611, if the CRC error check determines there is an error in the received frame, the CRC error check unit 355 notifies the Rx Ack generator unit 360 and the Rx SerDes 350 of the error. The Rx Ack generator unit 360 may freeze the Ack state and the Rx Ack indicator value (block 625). The frozen Rx Ack indicator value may be forwarded to the Tx SerDes 370, and may be transmitted on the communication path 14B (block 617). Operation proceeds as described above in conjunction with the description of block 619.

Referring back to block 613, if the receiver receives a frame and the Ack state is frozen, if the Rx SerDes 350 determines the frame is not a control frame (block 627) the Rx SerDes 350 drops the frame (block 629). However, if the frame is a control frame (block 627), the Rx SerDes 350 clears the Ack state and resets (i.e., initializes) the Rx Ack indicator value (block 631). Operation proceeds as described above in conjunction with the description of block 617.

It is noted that as described above, in an alternative embodiment, the Rx Ack indicator value may be a value (e.g., a single bit value) that remains constant while no errors have been detected in the received frames. This value is repeatedly sent to indicate this error-free state. Upon detecting an error in a received frame, the Rx Ack generator unit 360 changes the value (e.g., to a predetermined error value). In certain of these alternative embodiments, the Ack state may be frozen upon detecting an error in block 625, and, instead of freezing the Ack value, the Rx Ack generator unit 360 may change the Ack value (e.g., to a predetermined error value), which may then be transmitted in block 617. Similarly, instead of updating the Ack value in block 615, the Rx Ack value may stay the same.

It is also noted that that although the operational flows are described and shown in a particular order, it is contemplated that in other embodiments, the operations depicted in the various blocks of FIG. 4A through FIG. 6 may be performed in a different order, as desired.

In many of the above embodiments, errors are assumed to be infrequent and the communication link latency to be low. Accordingly, at least some of the embodiments described above may precisely track error free reception and acknowledge progress less frequently on a low bandwidth link. When an errored frame is received, the acknowledgment channel may precisely identify the point of failure by continuing to transmit the identifier of the last known good frame, until either the error is cleared with a retransmission of the frame having the error or the system error is cleared as described above.

Thus, various ones of the above embodiments may optimize the communication link to have the lowest overhead during normal operation at the expense of a longer response time relative to the frame times. In addition, the retransmit queue shown in some embodiments may be a store-aside buffer, thus not getting into the critical latency path. Further, no temporary hold queue is required on the receive side, which may further reduce complexity and system latency.

It is noted that although the above embodiments have been described in terms of a serial communication link, it is contemplated that in other embodiments a parallel link may be used.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a receiver unit configured to receive frames of data from a transmitter unit of a different apparatus via a first communication path;
an error detection unit configured to detect data errors in the frames of data received via the first communication path;
an acknowledgment unit configured to maintain an acknowledgement indicator indicative of whether frames received by the apparatus via the first communication path are error free, wherein, in response to the error detection unit detecting a data error in a received frame, the acknowledgement unit is configured to indicate an error condition on the first communication path by freezing a value of the acknowledgement indicator;
wherein the apparatus is configured to successively convey values of the acknowledgement indicator to the different apparatus via a second communication path while the apparatus is receiving frames via the first communication path, including at least one value that indicates that at least one error-free frame has been received from the apparatus.

2. The apparatus as recited in claim 1, wherein a given frame of data comprises an acknowledgement field to convey a corresponding value of the acknowledgement indicator.

3. The apparatus as recited in claim 2, wherein the acknowledgement indicator comprises a count value indicative of the number of error-free frames received by the apparatus since an initialization event, and wherein freezing the value of the acknowledgement indicator causes at least two successive identical count values to be conveyed to the different apparatus.

4. The apparatus as recited in claim 3, wherein the count value is a multi-bit value, and wherein the apparatus is configured to convey the multi-bit value to the different apparatus using a plurality of frames.

5. The apparatus as recited in claim 2, wherein the acknowledgement indicator comprises a single bit, and wherein the acknowledgement unit is configured to toggle a state of the acknowledgement indicator for each received frame for which no data errors are detected by the error detection unit, and wherein freezing the value of the acknowledgement indicator causes at least two successive identical values of the acknowledgement indicator to be conveyed to the different apparatus.

6. The apparatus as recited in claim 1, wherein a given frame of data comprises a data link field to convey a control indicator that is indicative of whether the given frame conveys data or whether the given frame conveys control information in a payload field of the frame.

7. The apparatus as recited in claim 1, wherein a given frame of data comprises a data link field to convey a control indicator that is indicative of whether the given frame conveys data or whether the given frame conveys control information in a payload field of the frame, and wherein in response to determining that a received frame of data is a control frame based upon the data link field, the acknowledgement unit is configured to ignore the control frame when maintaining the value of the acknowledgement indicator.

8. An apparatus, comprising:
a transmitter unit configured to transmit frames of data to a receiver unit of a different apparatus via a first communication path;
a receiver unit configured to successively receive values of an acknowledgement indicator from the different apparatus via a second communication path while the transmitter unit is transmitting frames via the first serial communication path, including at least one value that indicates that at least one error-free frame has been received by the receiver unit of the different apparatus, wherein the values of the acknowledgement indicator are indicative of whether error-free frames were received by the different apparatus via the first communication path;

an error handling unit configured to determine an error condition exists in response to detecting that the receiver unit of the apparatus has received a frozen value of the acknowledgement indicator from the different apparatus.

9. The apparatus as recited in claim 8, wherein a given frame of data comprises an acknowledgement field to convey a corresponding value of the acknowledgement indicator, and a data link field to convey a control indicator that is indicative of whether the given frame conveys data or whether the given frame conveys control information.

10. The apparatus as recited in claim 8, wherein the error handling unit is further configured to compare received values of the acknowledgement indicator to previously received values of the acknowledgement indicator to determine whether the error condition exists.

11. The apparatus as recited in claim 10, wherein the error handling unit is further configured to determine that an error condition exists in response to detecting at least two successive identical values of the acknowledgement indicator.

12. The apparatus as recited in claim 9, further comprising a link control unit coupled to the error handling unit and configured to cause a control frame having a particular encoding in a payload field of the control frame to be sent to the different apparatus, wherein a data link field of the control frame indicates the frame is a control frame, wherein the particular encoding is configured to cause the frozen value of the acknowledgement indicator to be reinitialized in the different apparatus.

13. The apparatus as recited in claim 12, wherein the link control unit is further configured to maintain a transaction frame count value that corresponds to a number of frames of data less a number of control frames sent to the different apparatus, and wherein the error handling unit is further configured to compare received values of the acknowledgement indicator to the transaction frame count value to determine whether the error condition exists.

14. A system comprising:
a first device; and
a second device coupled to the first device via a first communication path and a second communication path;
wherein the first device is configured to receive frames of data from the second device via the first communication path, and to detect errors in the frames of data;
wherein the first device is further configured to:
maintain an acknowledgement indicator indicative of whether error-free frames are received via the first communication path; and
freeze a value of the acknowledgement indicator in response to detecting a data error in a received frame;
successively convey values of the acknowledgement indicator to the second device via the second communication path while the first device is receiving frames via the first communication path, including at least one value that indicates that at least one error-free frame has been received;
wherein the second device is configured to receive values of the acknowledgement indicator from the first device, and to determine that an error condition exists in response to receiving a frozen value of the acknowledgement indicator.

15. The system as recited in claim 14, wherein a given frame of data comprises an acknowledgement field to convey a corresponding value of the acknowledgement indicator, and a data link field to convey a control indicator that is indicative of whether the given frame of data conveys data or whether the given frame conveys control information.

16. The system as recited in claim 15, wherein the acknowledgement indicator comprises a count value indicative of the number of error-free frames received by the first device since an initialization event, and wherein the frozen value of the acknowledgement indicator corresponds to two successive identical count values.

17. The system as recited in claim 16, wherein the count value is a multi-bit value, and wherein the first device is configured to convey the multi-bit value to the second device using a plurality of frames.

18. The system as recited in claim 15, wherein the value of the acknowledgement indicator comprises a single bit, and wherein the first device is configured to toggle the value of the acknowledgement indicator for each received frame for which no errors are detected by the error detection unit, and wherein the frozen acknowledgement indicator corresponds to two successive identical values of the acknowledgement indicator.

19. The system as recited in claim 15, wherein the second device is further configured to transmit to the first device a control frame having a particular encoding in a payload field of the frame of data in response to receiving the frozen value of the acknowledgement indicator, wherein a data link field of the control frame indicates the frame is a control frame, wherein the particular encoding is configured to cause the first device to reinitialize the frozen value of the acknowledgement indicator.

20. The system as recited in claim 19, wherein the second device is further configured to retransmit one or more previously transmitted frames of data to the first device subsequent to transmitting the control frame having a particular encoding in the payload field in response to receiving a frozen acknowledgement indicator.

21. The system as recited in claim 14, wherein the second device is further configured to compare received values of the acknowledgement indicator to previously received values of the acknowledgement indicator to determine whether the error condition exists.

22. The system as recited in claim 21, wherein the first device comprises a memory controller and the second device comprises a memory device.

23. The system as recited in claim 14, wherein the first communication path and the second communication path are serial communication paths.

24. An apparatus, comprising:
a receiver unit configured to receive frames of data from a transmitter unit of a different apparatus via a first communication path;
an error detection unit configured to detect data errors in the frames of data received via the first communication path;
an acknowledgment unit configured to maintain an acknowledgement indicator indicative of whether frames received by the apparatus via the first communication path are error free, wherein, in response to the error detection unit detecting a data error in a received frame, the acknowledgement unit is configured to indicate an error condition on the first communication path by setting a current value of the acknowledgement indicator to a predetermined error value;

wherein the apparatus is configured to successively convey values of the acknowledgement indicator to the different apparatus via a second communication path while the apparatus is receiving frames via the first communication path, including at least one value that indicates that at least one error-free frame has been received.

25. The apparatus as recited in claim 24, wherein the acknowledgement indicator comprises a single bit, and wherein the predetermined error value comprises the opposite value of a last value of the acknowledgement indicator.

26. An apparatus, comprising:
a transmitter unit configured to transmit frames of data to a receiver unit of a different apparatus via a first communication path;
a receiver unit configured to successively receive values of an acknowledgement indicator from the different apparatus via a second communication path while the transmitter unit is transmitting frames via the first communication path, including at least one value that indicates that at least one error-free frame has been received by the receiver unit of the different apparatus, wherein the values of the acknowledgement indicator are indicative of whether error-free frames were received by the different apparatus via the first communication path;
an error handling unit configured to determine an error condition exists in response to detecting that the receiver unit of the apparatus has received from the different apparatus the current value of acknowledgement indicator that is set to the predetermined error value.

27. The apparatus as recited in claim 26, wherein each value of the acknowledgement indicator comprises a single bit, and wherein the predetermined error value comprises the opposite value of a last value of the acknowledgement indicator.

* * * * *